Aug. 25, 1942.      W. B. BOICE      2,294,272
WOODWORKING MACHINE
Filed March 17, 1939      5 Sheets-Sheet 1

Inventor
WILLIAM B. BOICE.
Attorney

Aug. 25, 1942.  W. B. BOICE  2,294,272
WOODWORKING MACHINE
Filed March 17, 1939  5 Sheets-Sheet 2
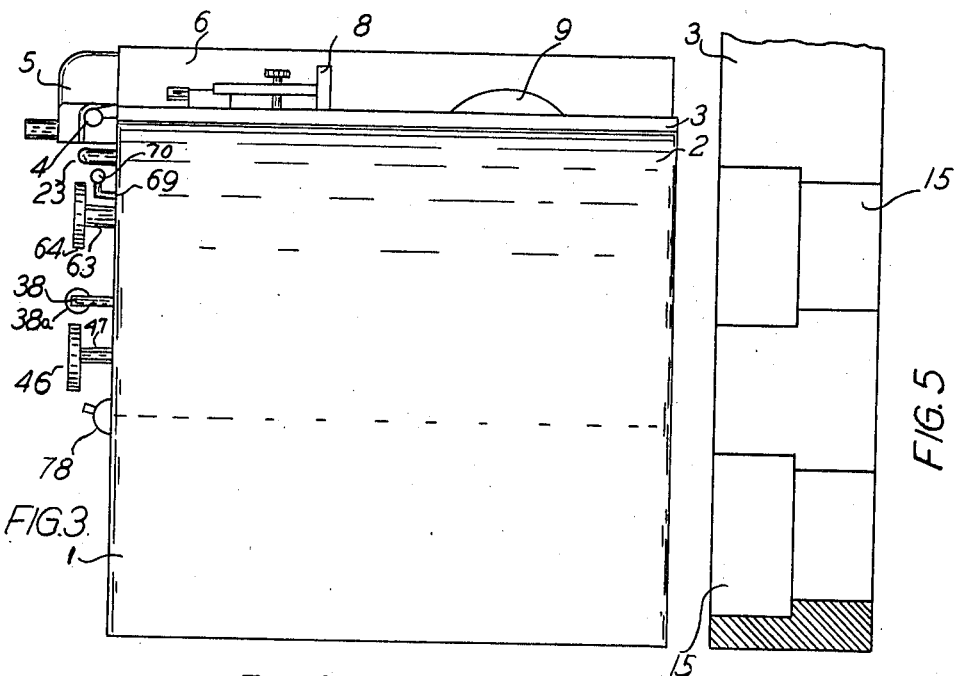
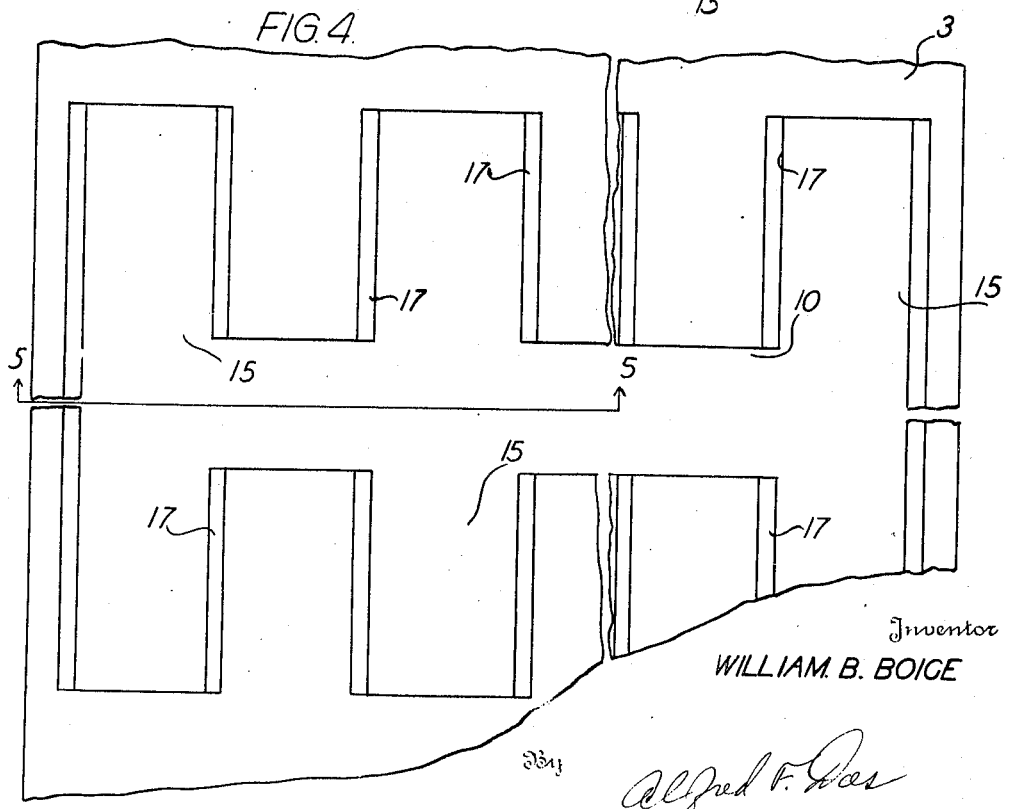
Inventor
WILLIAM B. BOICE Aug. 25, 1942.　　　　　W. B. BOICE　　　　　2,294,272
WOODWORKING MACHINE
Filed March 17, 1939　　　　5 Sheets-Sheet 3
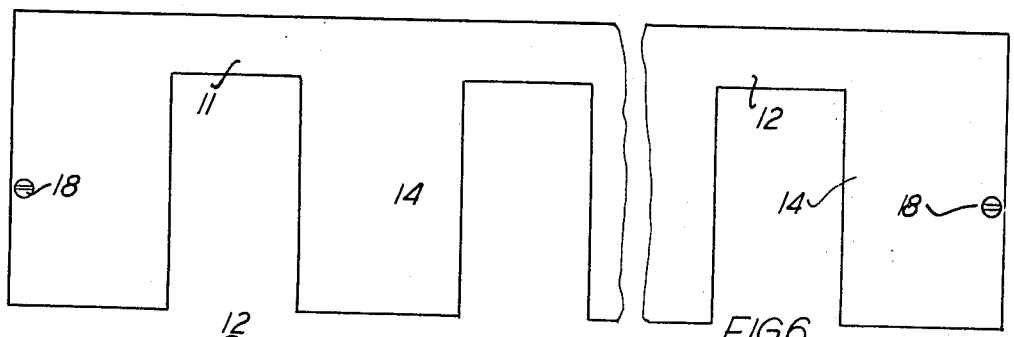
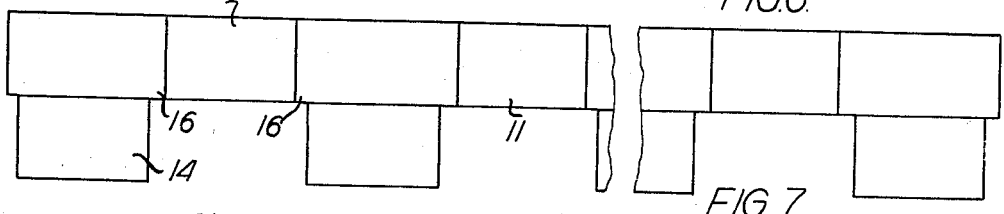
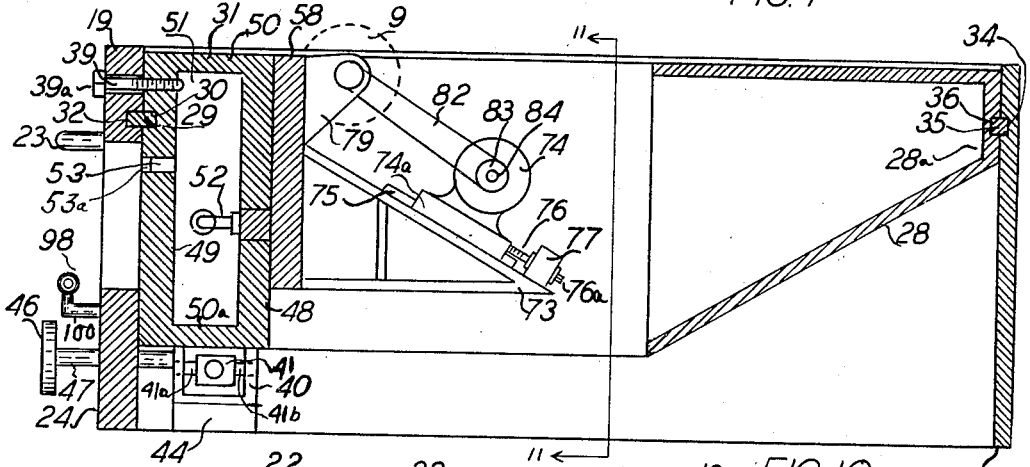
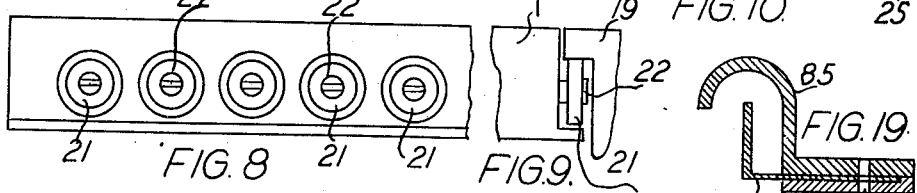
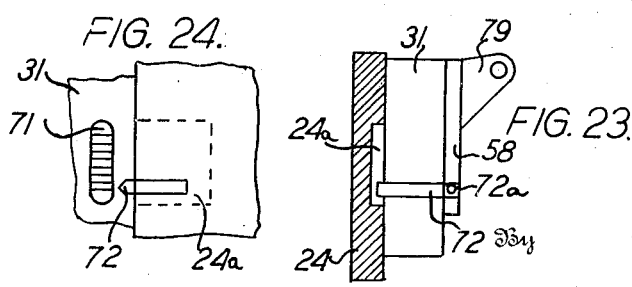
Inventor
WILLIAM B. BOICE
Attorney Aug. 25, 1942.　　　W. B. BOICE　　　2,294,272
WOODWORKING MACHINE
Filed March 17, 1939　　　5 Sheets-Sheet 4

Inventor
WILLIAM B. BOIGE
By
Alfred F. Rees
Attorney

Aug. 25, 1942.   W. B. BOICE   2,294,272
WOODWORKING MACHINE
Filed March 17, 1939   5 Sheets-Sheet 5

Inventor
WILLIAM B. BOICE
By
Alfred F. Dees
Attorney

Patented Aug. 25, 1942

2,294,272

UNITED STATES PATENT OFFICE 2,294,272

WOODWORKING MACHINE

William B. Boice, Toledo, Ohio

Application March 17, 1939, Serial No. 262,432

5 Claims. (Cl. 143—47)

This invention concerns wood-working machinery and more specifically relates to a sawing machine capable of making a plurality of bevel or straight cuts as either a cut off saw or as a rip saw.

The object of this invention is to provide a sawing machine of the pull type that is capable of making a plurality of angular transverse cuts and that can also be adapted to make a plurality of either square or bevel cuts as a rip saw.

A still further object of the invention is to provide low friction guideways for the horizontally movable tool or cutter carriage. These guideways are adapted to permit the carriage to move freely and easily in its longest direction and still keep the carriage moving in a straight line.

A still further object of this invention is to provide means on the cutter or tool carriage that will permit the cutter to be vertically adjusted to obtain a variety of depths of cut and disposing same with a further means providing for adjusting the cutter to make any one of a plurality of bevel cuts.

A still further object of the invention is to provide a carriage device for the cutter in which the several parts are compactly arranged.

A still further object of the invention is to provide means whereby all the controls are centralized and are carried on said carriage such that they will always be readily available to the operator irrespective of the position of the carriage in the wood-working machine.

A still further object of the invention is to provide means in the tool carriage to firmly lock the several movable and adjustable parts of the wood-working machine in position and in a selected position of adjustment.

A still further object of the invention is to reduce the cost of manufacture of a bevel cutting pull saw and which will simultaneously increase the efficiency of the machine and the accuracy of the cutting operation.

Further objects and advantages will appear as the description proceeds, which taken in connection with the accompanying drawings sets forth the preferred embodiment of the invention but such description and drawings are not to be construed as limitations of the invention which is to be limited only by the appended claims. Any and all variations, alterations and modifications of structure coming within the spirit and scope of the teachings and disclosure are to be included within the invention.

The appended drawings set forth a preferred practical embodiment of the invention in which:

Figure 3 is a side elevational view looking toward the left in Figure 1.

Figure 4 is an enlarged plan view of the walls of the table top of the machine showing the construction of the adjustable saw slot.

Figure 5 is an end view of the walls of the saw slot of the table top along the line 5—5 of Fig. 4.

Figure 6 is an enlarged plan view of the adjustable element of the saw slot.

Figure 7 is a side view of the adjustable slot element of Figure 6.

Figure 8 is an elevational view of the roller supports on which the horizontal movable carriage is adapted to slide.

Figure 9 is an end view of the construction of Figure 8 showing a portion of the tool carriage operatively associated with the roller supports.

Figure 10 is a longitudinal section view of the tool carriage taken substantially along the line 10—10 of Figure 1 with the cutter slide schematically represented.

Figure 19 shows a section view of the guard and splitter taken substantially along the line 19—19 of Figure 17.

Figure 23 is a vertical fragmentary section view of one end of the tool carriage and its supporting wall showing the pointer attached.

Figure 24 shows a fragmentary view of the carriage showing the pointer in operative relation with the vertical adjustment gauge.

Figure 1:
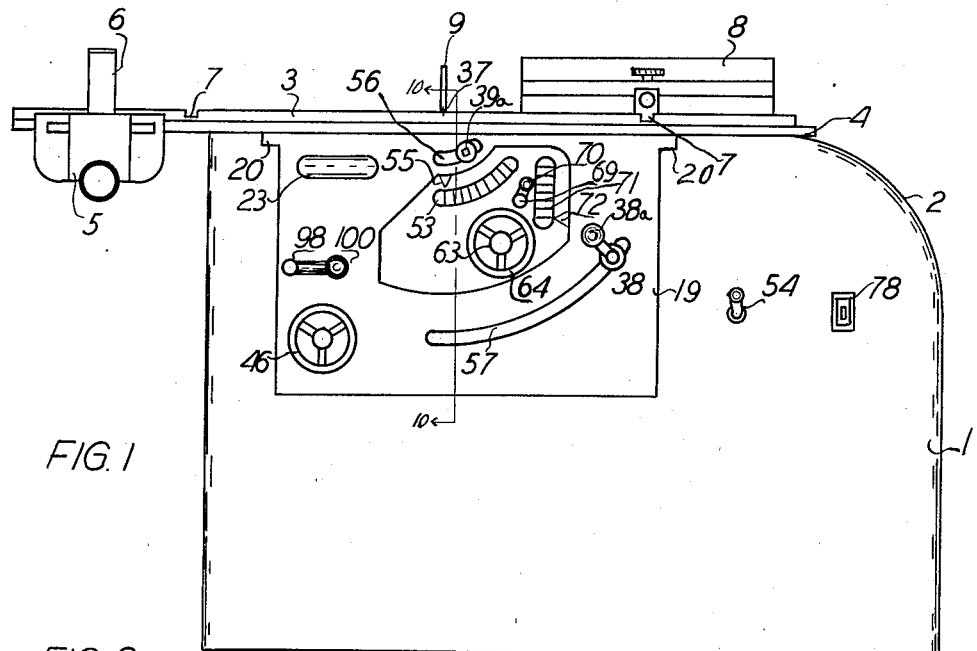
Figure 1 shows a front elevational view of the wood-working machine.

The wood-working machine of the instant invention comprises initially a base structure 1 which is of a substantially rectangular shape but having a curved surface as at 2. On the upper part of the base structure there is arranged a table top or work supporting surface 3 preferably integrally associated with the base structure 1. At one edge, preferably the forward edge, a fence support 4 is mounted which supports a fence locking and adjusting mechanism 5 with which the fence 6 is intimately associated. The details of the fence support and its associated mechanism is set forth in pending application S. N. 251,697, filed Jan. 19, 1939.

The table top or work supporting surface 3 is provided with a plurality of grooves 7 into one of which a work guide 8 is adjustably secured to assist in making angular cross cuts in a work piece. The cutter 9 rotatably supported in a movable carriage 19, hereinafter described in greater detail, is intended to be moved bodily through the work to perform a cross cutting operation on the work piece when it is at rest against the guide 8. Provision must therefore be made for a slot 10 in the table top 3 to enable a saw or cutter 9 to be pulled through the work. Since it is also intended to operate the machine with a dado cutter provision has been made to vary the width of the slot 10 to enable various combinations and widths of cutters to be employed. The essential object of the adjustable width slot is to permit a work piece to be supported right up against the cutter and to prevent any possible tipping of the work piece so as to cause it to become jammed between the cutter and the edge of the slot.

Figure 2:
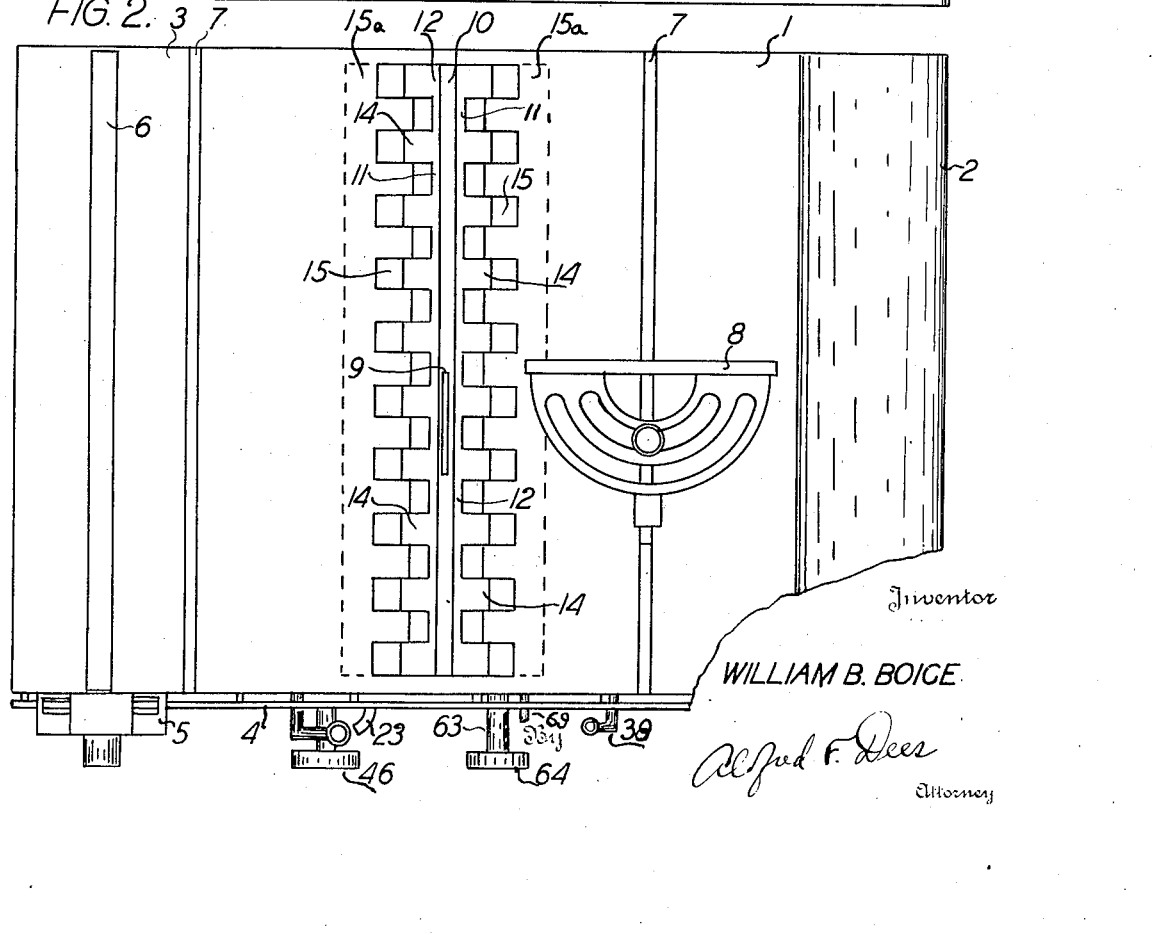
Figure 2 is a top plan view of the wood-working machine.

The foregoing results are accomplished in the provision of a pair of adjustable slot wall members 11, 11 that are mounted in the table top 3. The detail of one of these members is shown more clearly in Figures 6 and 7. It will be apparent that each of the members comprise initially a long relatively narrow bar member 12. This bar member 12 has integrally associated therewith a plurality of tooth or leg members 14 which cooperate with a corresponding slot 15 in the table top or in a separate piece 15a insertable in the table top as indicated by the dotted lines in Figure 2. Each of the leg or tooth members 14 is shouldered as at 16, 16. This results in providing a slot of somewhat narrower width than the corresponding leg or tooth. The slots 15 cut into the table top or in the separate piece 15a are likewise shouldered as at 17, 17. When therefore the member 11 is fitted into the table top the teeth or legs 14 of movable members 11 will fit into the slots 15 of the table top. The shoulders 16 and 17 cooperate to maintain the top of the table and the top of the tooth bar member 11 and 12, 12 flush. Attention is at this point invited to the fact that the bar member 11 of the toothed portion 14 can be borught into close proximity with the saw or cutter. It should be further evident that a work piece laid on the table in working or cooperative relation with the saw will be supported throughout the full length of the table because the teeth of the movable element will provide the intermediate support as the toothed member is adjusted relatively of the cutter or saw. The bar element 11 will provide a firm support immediately along side of the cutter. A pair of locking screws 18, 18 may be provided in each of the toothed elements to lock the bar elements 11 and 11 in any desired adjusted position.

It was stated above that one of the objects of the instant invention is directed to a pull saw for cross-cutting operations and also for rip-cutting operations and that it is intended to produce a bevel or straight side cut in either ripping or cross-cutting operations. To the achievement of that end the machine is provided with a movable carriage slidably mounted on suitable ways on the underside of table 3, or in the bed 1 of the machine. The carriage 19 consists initially of a rectangular shaped element that is somewhat longer than either its width or its depth. The carriage is provided with a pair of shoulders 20 that are integrally associated with the walls of the carriage. The adjacent side walls of the table or bed of the machine are equipped with a plurality of roller mechanisms 21, 21 etc. These rollers are journaled on pins 22, 22 removably supported in the side wall of the channel in bed 1 or table 3 in which carriage 19 slides. The rollers are preferably rotatably supported on the pins 22 by means of anti-friction bearings (not shown) in order to reduce friction to a minimum and thereby reduce to a minimum the force required in pulling or moving the carriage relatively of the bed 1 of the machine. The shoulders 20 rest upon the rollers 21 maintaining both tool carriage and machine in proper spaced relationship.

It was pointed out above that the invention was directed in part to a pull type saw for cross cutting operations. The foregoing is accomplished initially by the horizontally movable carriage 19 previously referred to. This carriage is equipped initially with a handle device 23 appropriately secured to the front wall of carriage 19. The handle 23 may be made integral with the carriage, if so desired, as shown. Other means may be provided for pulling the saw through the work such as a conventional screw and gearing or a hydraulic system each of which is well known to the art.

The saw 9 is adapted to be tilted about an axis extending longitudinally of the horizontally movable carriage 19. The saw or cutter 9 is also adapted to produce cuts of varying depth; the means for accomplishing each of these adjustments will be hereinafter set forth. The means which are provided in the carriage, therefore, to produce the aforementioned results in brief constitute a slide device for adjusting the cutter slide relatively vertically of the carriage and a secondary or swinging carriage for tiltably or pivotally mounting the cutter 9 in the horizontally movable carriage 19. The carriage 19, by reference to Figures 10 and 11 comprises a forward wall 24 and a rear wall 25. These two walls are joined by side walls 26 and 27. The bottom of the carriage is left open to permit dust and cuttings to fall through into the base of the machine and thence be disposed of in any convenient manner.

Figures 12, 22:
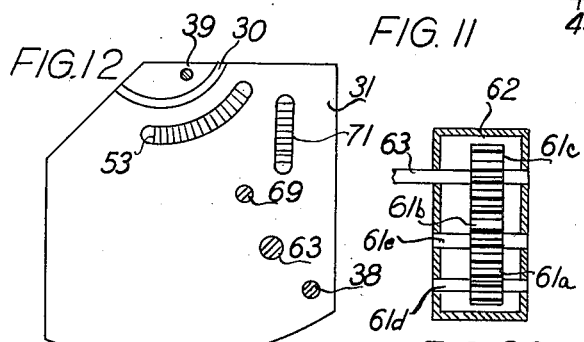
Figure 12 is an end view of the cutter carriage support showing the dials and arrangement of the means for swingingly supporting the tool carriage.
Figure 22 is a vertical section view of the gear housing for vertically adjusting the cutter slide.

Within this carriage or support is a secondary support or carriage 28 which is swingably or pivotally supported in the carriage 19. The swinging or pivoting of the carriage is accomplished by a tongue and groove construction similar to that described in U. S. Patent No. 1,922,151 and in the specific instance constitutes a tongue 29 in the form of a segment of a circle. This tongue cooperates with groove 30 in wall or end piece 31 of carriage 28 and with a second groove 32 formed or cut into wall 24 of carriage 19. The general shape of the grooves are shown in Figure 12. The opposite end of the carriage or swinging support is also equipped with a similarly shaped tongue and groove construction, which comprises the tongue or circular key 35 fitting into a groove 34 cut into the end wall 25 of the carriage 19 and a groove 36 cut into end wall 28a of carriage 28. In assembling the swinging carriage 28 within the horizontally slidable carriage 19, carriage 28 is slipped into the carriage 19 and when the grooves cut into the end walls of the respective carriages 19 and 28 are in alignment the circular keys or tongues are slipped or forced into the grooves. The center of rotation 37 of the tongues and the circular grooves previously described lies in the upper surface of the table and in the plane of the saw or cutter 9. By this arrangement the angle of adjustment of the saw for producing a bevel rip cut can be accurately determined and read directly.

As soon as the circular keys are fitted in the grooves the two carriages may be locked together with a pair of locking devices mounted on the forward or front wall 24 of the carriage 19. These devices comprise locking screws 38 and 39 that are threaded into end piece 31 (Figure 12). Figure 10 discloses only the locking screw 39, actuable by convenient head 39a, threaded into the end piece 31. Locking device 38 is also threaded into wall 31 as shown in Figure 12 and is actuable by a lever 38a. It is obvious therefore that when each of the locking screws is tightened wall 31 will be clamped onto or against wall 24 of the carriage 19 thereby preventing any possible disturbance of a selected adjustment.

Means have been provided for swingably or pivotally adjusting the carriage 28 in the longitudinally movable carriage 19. These means consist initially of a bracket 40 that is integrated with a part of the end wall 31. This bracket contains a swinging nut mechanism 41 that is suspended in the bracket by means of two pivots 41a and 41b integral with the nut 41. A screw 43 is rotatably mounted in the nut at one end thereof and its opposite end is taken off or connected to the outlet of a gear box 44 appropriately secured to the side wall 26 of carriage 19. It is necessary that some means be provided between gear box 44 and screw 43 that will permit a flexing of the screw 43 and to that end a coupling 45 or other appropriate flexible connecting means is disposed between the screw 43 and the gear box 45.

Screw 43 is actuated from hand wheel 46 carried in the forward wall of horizontally movable carriage 19 and is rotatably supported therein. A shaft 47 connects the hand wheel to the gear box 44 such that rotative movements of the hand wheel are transmitted to the screw 43 whereby the carriage 28 is swingably or pivotally adjusted relatively to the carriage 19 and the table top 3. The details of the gear box are in dotted lines and comprise a worm mounted on shaft 47. Worm 47a engages a worm wheel 44a mounted on shaft 44b rotatably mounted in the housing 44 and connecting with coupling 45. The worm and wheel organization enables the carriage to be maintained in its adjusted position a sufficient period of time to enable the operator to turn locking screws 38 and 39 to permanently lock the pivotally or swingably mounted carriage 28 to the horizontally movable carriage 19.

Means are provided for accurately determining the degree of rotation or swinging movement of the carriage 28. To this end wall 31 is constructed essentially of divided portions 48 and 49 connected on all sides by a web portion 50, 50a, etc. This provides an opening or space 51 in which is disposed a light source 52 whereby appropriate dials or indicia is illuminated for easy reading, which dial and indicia is set in the forward wall portion 49 of the end wall construction 31. The wall 31 may, of course, be provided with means such that light source 52 may be replaced when necessary. The wall section 49 is slotted arcuately as at 53 to retain a translucent insert 53a therein which has significantly printed on it the desired markings whereby any degree of rotation of carriage 28 may be determined. When therefore the light source 52 is illuminated by closing switch 54 the numerals or markings on the translucent insert will be very easily read. To further assist the operator in making his angular adjustments of the carriage 28 a pointer 55 integral with the forward wall 24 of carriage 19 is provided. This pointer is stationary and the end wall section 31 with its translucent insert moves or swings relative thereto, whereby the position of angularity or tilt of cutter 9 relative to table top 3 is determined.

In this connection attention is invited to the fact that slots are provided in the forward wall 24 of carriage 19 to accommodate locking screws 38 and 39 carried by wall section 31. These slots 56 and 57 radiate from, or are drawn from the same center as the circular keys 35 and 29 as well as the slot 53 carrying the translucent insert.

Figure 13:
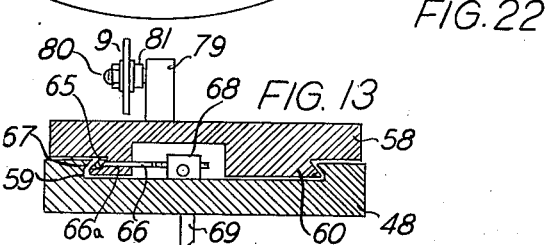
Figure 13 is a section view substantially along the line 13—13 of Figure 11 and showing the means for locking the cutter carriage to the swinging support.

It was also pointed out above that the saw or cutter 9 and the slide upon which it is mounted in the carriage 28 is capable of a vertical adjustment to vary the depth of cut the cutter may take or the amount the saw or cutter 9 extends above the table top 3. Slide 58 is mounted on portion 48 of the wall 31, see Fig. 13. The wall 48 has a dove-tailed portion 59 cut therein which is adapted to receive a corresponding and co-operating dove-tailed portion 60 formed in or cut into the cutter slide 58. Slide 58 is thereby enabled to slide at right angles to the axis of rotation of the swingably or pivotally mounted carriage 28.

Means have been provided for accomplishing the aforementioned vertical adjustment. Slide 58 has gear teeth 61 (Figure 11) formed along one of its edges with which a gear 61a, Figure 22, rotatably mounted in the housing 62, engages for raising and lowering the cutter slide 58. The gear 61a is engaged by an idler gear 61b, which is in mesh with a gear 61c secured to shaft 63. Gears 61a and 61b are mounted on shafts 61d and 61e respectively rotatably mounted in the housing 62. The gears are, of course, only schematically shown to establish the operative relation of the parts. The shaft 63 is rotatably mounted in the wall 31 and in the housing 62 and has a hand wheel 64 applied thereto for rotating the shaft 63. Attention is invited to the fact that the hand wheel swings along with carriage 28 to thereby enable the vertical adjustment of the cutter slide to be effectuated in any angular position of the carriage 28.

Locking means is provided for preventing any slippage of the tool slide 58 relative to the wall portion 48 of the swingable cutter slide 28. This comprises preferably an adjustable gib 65 that is urged against portion 67 of the dove-tailed groove in the portion 48 of the wall 31. Housing 68 has therein a suitable gearing similar to 44a and 47a that axially moves screw 66 to urge the adjustable gib 65 into engagement with the portion 67 previously described. The screw 66 passes through a slot 66a cut into the dove-tailed part of 58 to permit relative movement of slide and screw. Shaft portion 69 is rotatably mounted in the wall section 31 and has a handle portion 70 secured thereto whereby the shaft 69 may be rotated to ultimately rotate the aforementioned gearing to move axially the screw 66 which locks adjustable gib 65 to the gib 67 and thereby locking cutter slide 58 to the portion 48 of wall section 31. In this connection attention is again invited to the fact that shaft 69 and the attached handle 70 swing with the carriage 28.

Means have been provided whereby the amount of vertical adjustment or depth of cut may be accurately determined. This comprises initially a translucent insertable element 71 having proper indicia arranged thereon assembled in an appropriate slot cut into portion 49 of the wall 31. A pointer 72 (Figures 1, 23, and 24) attached to slide 58 by screw 72a extends around side of wall 31 and moves relatively of wall 24 in a slot 24a such that the pointer may move relatively of wall 24 and wall 31 and which will assist in indicating the amount of the vertical adjustment of the cutter or the depth of cut. The indicia on the insert 71 are illuminated from the light source 52 in the same manner as they are on insert 53.

Figure 11:
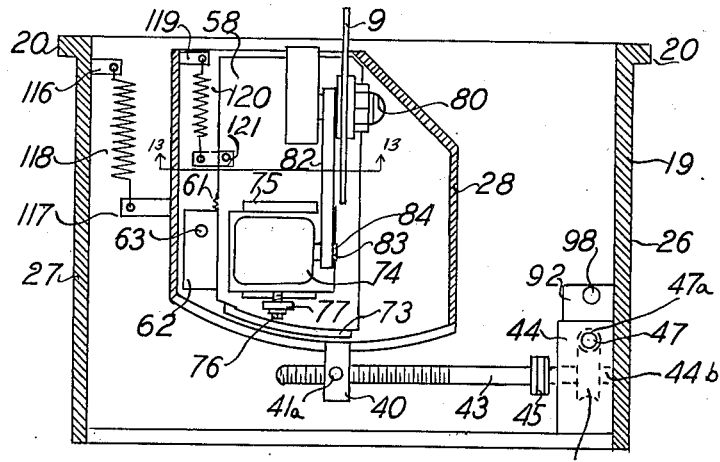
Figure 11 is a cross sectional view of the tool carriage looking in the direction of the arrows on line 11—11 of Figure 10 showing the arrangement of the cutter carriage and its component parts and the gear mechanism for swinging the cutter carriage.

Cutter slide 58 is provided with a bracket 73, schematically shown in Figures 10 and 11, which is preferably integrally associated with cutter slide 58. The bracket 73 adjustably supports a motor 74 or other source of power. The motor 74 is slidably mounted on slides 75 which are preferably of the dove-tailed character. Motor base 74a has necessarily corresponding dove-tailed slides to prevent any possible lateral or transverse motion of the motor and its support relative to bracket 73. Bracket 73 has a lug 77 integral therewith which rotatably receives a shaft or screw 76. Screw 76 is appropriately threaded into the base 74a of the motor and is headed as at 76a. It is evident therefore that when the screw 76 is rotated, by applying an appropriate wrench or crank to 76a, that it will move motor 74 and its base relatively of the bracket 73. The purpose of this motion is to tighten the belt drive for the saw or cutter hereinafter described. A switch 78 mounted on the housing 1 and convenient to the other controls of the machine is adapted to govern the starting and stopping of motor 74.

Cutter or saw 9 is rotatably mounted in a bearing bracket 79 that is disposed on the cutter slide 58 as indicated. Saw or cutter 9 is secured to a shaft 80 which shaft is rotatably mounted in suitable bearings (not shown) mounted in the bearing bracket 79. The shaft 80 also carries a pulley 81 that is adapted to receive belt or other power transmitting means 82 threaded around a pulley 83 carried on the armature shaft 84 of the motor 74. A compact drive for the cutter from the prime mover organization is thereby provided. Shaft 80 as will be noted from the drawings is of a stub variety to enhance the compactness of the cutter support and its drive.

Figure 18:
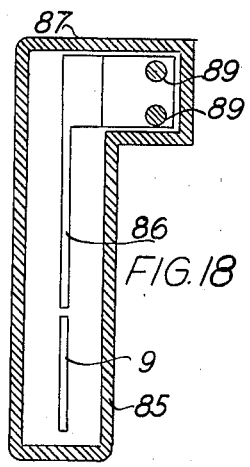
Figure 18 shows a section view along the line 18—18 of Figure 17 showing the operative relationship of the cutter, its guard and the splitter.
Figure 17:
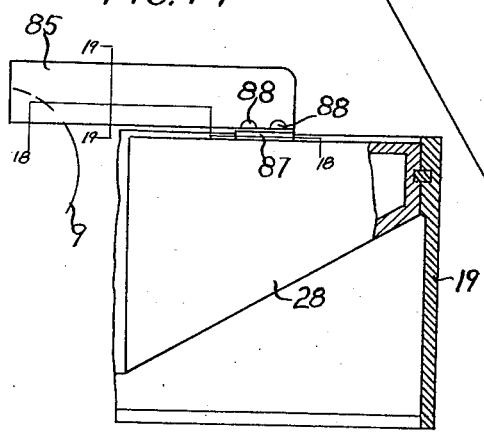
Figure 17 shows a fragmentary side view of the swinging carriage having the cutter guard and splitter arranged thereon.

A guard mechanism 85 is provided for the saw to prevent injury to the cutter and to the operator. This guard is preferably of a shape such as generally shown in Figures 17, 18 and 19. Associated with the guard 85 is a splitter 86 whose function is to prevent a possible pinching of the saw or cutter 9. The saw guard 85 is provided with a base structure 87 that rests upon or is secured to the rear portion of the swinging carriage 28. The base portion 87 is appropriately socketed to receive the horizontal portion of the splitter 86 as shown in Figures 18 and 19. The entire assembly is secured to the rear end of the carriage 28 by screws 88 and 88. The base portion 87, the horizontal portion of splitter 86 and the horizontal portion of guard 85 are appropriately apertured as at 89, 89 to receive the screws 88, 88 which are threaded into the carriage 28.

Figures 15, 16:
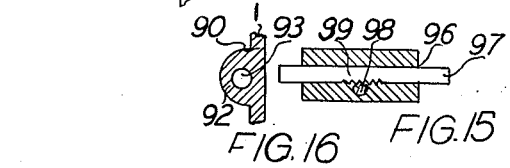
Figure 15 is a section view along the line 15—15 of Figure 14 showing the locking bolt.
Figure 16 is a section view along the line 16—16 of Figure 14 showing the socket with which the locking bolt cooperates.
Figure 14:
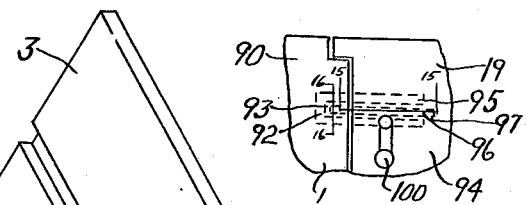
Figure 14 shows a general plan view of the means for locking the tool carriage against horizontal movements.
Figure 25:
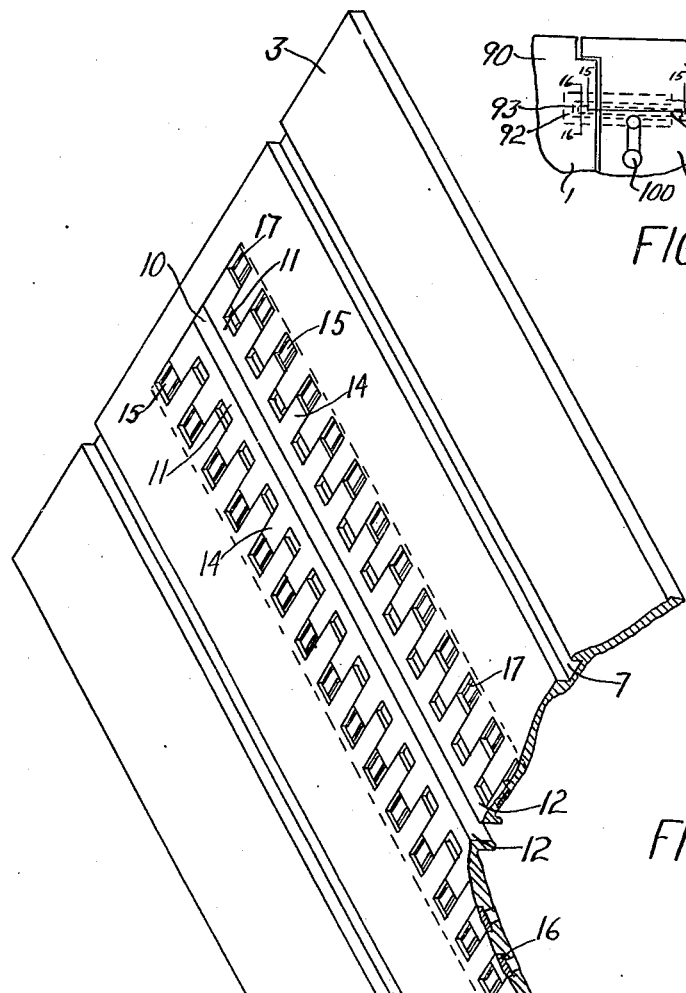
Fig. 25 shows a perspective view of the table top.

In view of the fact that the machine is intended to perform a ripping operation as well as a cross cutting operation means have been provided to lock the slidable carriage 19 in the bed or base portion 1 of the machine. The locking means are specifically shown in Figures 14, 15 and 16. A wall portion 90 of the bed 1 is provided with a boss 92 apertured as at 93. Adjacent wall portion 94 of the carriage 19 is likewise bossed as at 95. Boss 95 is provided with an aperture 96 which aperture is in alignment with the aperture 93 of boss 92. Aperture 96 has a bolt 97 therein having teeth 99 cut into it which cooperate with teeth on a transverse shaft 98 which extends outwardly and is rotatably mounted in the wall portion 24 of carriage 19. The shaft 98 has a handle or crank 100 secured thereto with which to rotate the shaft 98 to bring locking bolt 97 into or out of engagement with the aperture 93 thereby locking or unlocking the carriage 19 relative to the bed 1 of the machine.

Attention is at this point invited to the fact that the machine provides a clustered control for the several adjustments this clustered control constituting the operator's station. It is to be observed that hand wheel 46 which controls the tilting of the carriage, hand wheel 64 which controls the depth of cut and the locking means controlled by levers 38, 70, and 100 and screw 39 are readily accessible to the operator from his operating position and is not necessary for him to step or reach to a remote part of the bed of the machine to control any one of the several adjustments. This applies equally to the fence control 5, the cross cut bevel guide 8, light switch 54 and motor switch 78. All of these as will be noted are conveniently disposed within easy reach of the operator and enables him to have instant control of any one of the several controllable devices.

Means have been provided to relieve some of the weight on the adjusting mechanism for the swingable carriage and for the vertically adjustable cutter slide. These means take the form of spring counterbalancer which relieve the screw or gear adjusting mechanism for the several adjustable carriages.

Carriage 19 and swingable carriage 28 have two brackets 116 and 117 respectively secured to them. These brackets have a spring 118 interposed between them, the ends of which are looped through apertures in the brackets or are otherwise attached to the brackets.

Carriage 28 and cutter slide 58 have brackets 119 and 121 respectively attached to them with a spring 120 interposed between them, the ends of which spring are looped through apertures in the brackets or are otherwise secured to the brackets.

From the foregoing it is apparent that each of the adjustable carriages is appropriately counterbalanced to relieve the screw and gearing in the adjusting mechanism of the load or weight of the slide and carriage.

Figure 20:
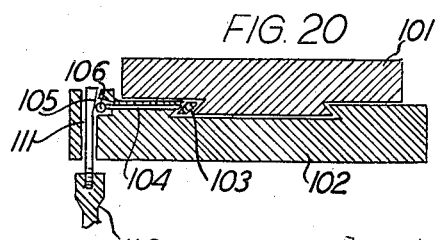
Figure 20 shows a modification of the cutter slide gib lock.

A modification of the cutter slide locking means is shown in Figure 20. 101 is a cutter slide dovetailed into a portion 102. An adjustable gib 103 is disposed in the dove-tailed construction as shown. The gib is brought into locking engagement with the dove-tailed portion of the slide 101 by means of a presser member 104. Presser member 104 is urged to the right as shown in Figure 20 by a ball member 106. Ball member 106 is urged to the right by wedge member 105 that is axially movable in an aperture 111 provided in the portion 102. Wedge bolt 105 is axially movable in portion 102, in aperture 111 and is threaded at one end as shown. The threaded end of bolt 105 is engaged in the threaded socketed end of element 112 which corresponds to shaft 69 having a crank similar to 70 attached thereto. Therefore when the shaft 112 is rotated by a convenient crank, wedge bolt 105 will be axially moved to release gib 103 by means of ball 106 and presser member 104 or will lock gib 103 against the dove-tailed portion of slide 101 depending upon the direction of axial movement of wedge bolt 105.

Figure 21:
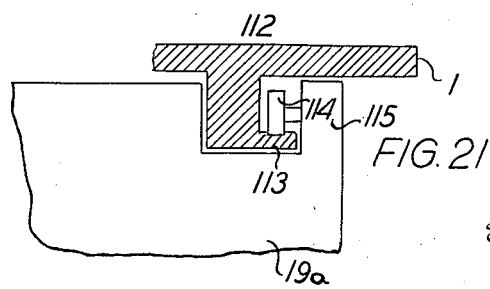
Figure 21 shows a modification of the tool carriage roller support.

Modification of the means for slidably mounting the carriage 19 relatively of the bed 1 of the machine is disclosed in Figure 21. 19a schematically represents the carirage. The bed of the machine 1 is shaped as at 112 and is equipped with a shoulder or ledge 113 that holds or on which roller 114, mounted on portion 115 of carriage 19a, is adapted to roll. The rollered carriage 19a moves relatively of the bed of the machine on the ledge 113. Roller 114 is similar in construction to roller 21 previously described and a plurality of rollers are preferably mounted on each side of the carriage.

That which is considered new, novel and useful and which it is intended to protect by Letters Patent of the United States is as follows:

1. In a machine performing a cutting operation, the combination, a channelled base structure, a work supporting means in said base, a carriage movable in said channel relatively of said base, a cutter movable with said carriage, means in said carriage adapted to tiltably and vertically adjust said cutter, said carriage tilting on an axis lying in the upper plane of the work supporting means and in the plane of the cutter, control means for actuating said last mentioned means from the operator's station, means to lock said means in adjusted position, means to move said carriage relatively of the base, means adapted to lock said carriage in said channelled base, and means to actuate each of said locks, said means extending to a position on the machine adjacent the operator's station.

2. In a wood-working machine, the combination, a channelled machine base having a table top, a carriage movable in said channel relative to said base, a swingable carriage mounted in said carriage, said carriage swingable on an axis lying in the upper plane of said table top, a cutter slide vertically mounted in said swinging carriage, means for moving said carriage, mechanism for swinging said swingable carriage, mechanism to vertically move said cutter slide, each of said mechanisms extending to and operable from the operator's station, means to counterbalance said swingable carriage and said vertically adjusted carriage and means to retain said swingable carriage and cutter slide in their respective positions of adjustment, means to actuate each of said last mentioned means and extending to and operable from the operator's station.

3. In a machine for performing a wood-working operation, the combination, a table top base having a channel equipped with roller ways, a carriage slidable in said channel on said roller ways, means to move said carriage, a swingable carriage in said movable carriage, said carriage swinging on bearings having an axis lying in the upper plane of the table, means to adjust said swingable carriage, means to counter-balance said swingable carriage, a cutter slide vertically movable on said swingable carriage said axis of swing also lying in the plane of the cutter, means to vertically adjust said slide, means to counterbalance said cutter slide and means to lock said swingable carriage and said cutter slide in adjusted position, means to actuate said lock; said means to adjust vertically and swingably and said means to lock each of said parts extending to the operator's station.

4. In a stationary machine, the combination, a table top base having a channel therein, a roller supported carriage relatively movable in said channel, means to move said carriage in said channel, means to lock said carriage against movement in said channel, means to actuate said lock means, means to support a swingably adjustable and vertically adjustable cutter in said carriage, said cutter swingable on an axis lying in the plane of the table top and in the plane of the cutter, counter-balancing means for said adjustments, mechanism to swingably and vertically adjust said cutter and means to retain said cutter in adjusted position, said adjusting means and said means to retain operable by mechanism extending to and terminating adjacent the operator's station.

5. In a material working device; a base having a plane side wall constituting the operator's side; a carriage movable relative to said base and at right angles to said wall and having an end wall; a carrier swingably mounted in said carriage and having an end wall in proximity to said carriage wall; a cutter slide mounted on said carrier; bearing means supporting said carrier for swinging movement; means to swing said carrier; means to adjust the cutter slide; a control for said means to swing mounted in one of said end walls; a control for said slide mounted in the other of said end walls, means to connect one of said controls with one of said means to adjust and means to connect the other of said controls with the other of said means to adjust.

WM. B. BOICE.